United States Patent
Markusic (10) Patent No.: US 10,773,678 B2
(45) Date of Patent: Sep. 15, 2020

(54) SIDE IMPACT OCCUPANT RESTRAINT AIRBAG MODULE

(71) Applicant: Honda Motor Co., Ltd., Tokyo (JP)

(72) Inventor: Craig Markusic, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 16/106,519

(22) Filed: Aug. 21, 2018

(65) Prior Publication Data
US 2020/0062212 A1 Feb. 27, 2020

(51) Int. Cl.
| B60R 21/231 | (2011.01) |
| B60R 21/207 | (2006.01) |
| B60R 21/2338 | (2011.01) |
| B60R 21/00 | (2006.01) |

(52) U.S. Cl.
CPC ...... *B60R 21/23138* (2013.01); *B60R 21/207* (2013.01); *B60R 21/2338* (2013.01); *B60R 2021/0006* (2013.01); *B60R 2021/23146* (2013.01); *B60R 2021/23161* (2013.01); *B60R 2021/23386* (2013.01)

(58) Field of Classification Search
CPC .... B60R 21/23138; B60R 2021/23386; B60R 2021/23146; B60R 21/207; B60R 2021/0006; B60R 21/2338; B60R 2021/23161
USPC ....................................... 280/730.2
See application file for complete search history.

(56) References Cited

U.S. PATENT DOCUMENTS

| 8,047,564 | B2 | 11/2011 | Kibat et al. |
| 8,684,408 | B2 * | 4/2014 | Thomas ............... B60R 21/231 |
| | | | 280/730.2 |
| 9,358,943 | B2 | 6/2016 | Borjeson et al. |
| 9,505,372 | B2 | 11/2016 | Yamada et al. |
| 9,783,151 | B2 * | 10/2017 | Fujiwara ............... B60R 21/233 |
| 10,166,945 | B2 * | 1/2019 | Fujiwara .......... B60R 21/23138 |
| 2010/0194083 | A1 * | 8/2010 | Sugimoto ............ B60R 21/207 |
| | | | 280/730.2 |
| 2011/0049852 | A1 * | 3/2011 | Kibat ............... B60R 21/23138 |
| | | | 280/743.2 |

(Continued)

FOREIGN PATENT DOCUMENTS

| JP | 6036450 | 11/2016 |
| WO | 2017086707 | 5/2017 |

*Primary Examiner* — Paul N Dickson
*Assistant Examiner* — Kurtis Nielson
(74) *Attorney, Agent, or Firm* — Rankin, Hill & Clark LLP (57) ABSTRACT

An airbag module mounted on a near-side vehicle seat is provided for protecting a far-side occupant seated in a far-side vehicle seat. The airbag module includes an airbag cushion and an inflator for providing inflation gas for the airbag cushion. The airbag cushion in a deployed state has a rear lobe portion and an extension portion. The rear lobe portion bulges laterally toward the far-side vehicle seat. The extension portion projects forward of the rear lobe portion in a longitudinal direction of the vehicle. In a near-side impact crash event the airbag cushion deploys upwards in a vehicle height direction and forward in the vehicle longitudinal direction with a deployment angle of the entire airbag cushion obliquely oriented to direct the airbag cushion away from the near-side vehicle seat and toward the far-side vehicle seat to provide restraint of the far-side occupant against lateral movement within the vehicle.

19 Claims, 6 Drawing Sheets

(56) References Cited

U.S. PATENT DOCUMENTS

| | | | |
|---|---|---|---|
| 2015/0084315 A1* | 3/2015 | Acker | B60R 21/23138 |
| | | | 280/728.2 |
| 2015/0197209 A1* | 7/2015 | Fujiwara | B60R 21/231 |
| | | | 280/730.1 |
| 2017/0036636 A1* | 2/2017 | Masuda | B60R 21/233 |
| 2017/0232922 A1* | 8/2017 | Wiik | B60R 21/23138 |
| | | | 280/730.2 |
| 2017/0253213 A1* | 9/2017 | Fujiwara | B60R 21/0136 |
| 2017/0334386 A1* | 11/2017 | Park | B60R 21/2338 |

* cited by examiner

FIG. 9

SIDE IMPACT OCCUPANT RESTRAINT AIRBAG MODULE

BACKGROUND

In a side impact crash event, the occupant sitting on the non-struck side of the vehicle (the "far-side" occupant) is directed towards the struck side of the vehicle by crash forces. This can result in undesired interactions with the occupant sitting on the struck side (the "near-side" occupant) and/or interior objects of the vehicle (e.g., a center console). Therefore, it is known to mount an airbag module on an inboard side of one of the vehicle seats to provide restraint of the far-side occupant against movement sideways within the vehicle and cushioning between the occupant and other interior objects.

BRIEF DESCRIPTION

According to one aspect, a side impact occupant restraint airbag module mounted on a near-side vehicle seat is provided for protecting a far-side occupant seated in a far-side vehicle seat. The airbag module comprises an inflatable airbag cushion and an inflator for providing inflation gas for the airbag cushion. The airbag cushion includes a far-side occupant facing surface, a near-side surface opposite the far-side occupant facing surface, and a mounting surface provided laterally in a vehicle width direction between the far-side occupant facing surface and the near-side surface. The mounting surface is secured to a seat back of the near-side vehicle seat. The airbag cushion in a deployed state has a rear lobe portion and an extension portion. The rear lobe portion bulges laterally toward a seat back of the far-side vehicle seat. The extension portion has a reduced width compared to the rear lobe portion and projects forward of the rear lobe portion in a longitudinal direction of the vehicle. In a near-side impact crash event the airbag cushion is adapted to deploy upwards in a vehicle height direction and forward in the vehicle longitudinal direction with a deployment angle of the entire airbag cushion obliquely oriented to direct the airbag cushion away from the near-side vehicle seat and toward the far-side vehicle seat to thereby provide restraint of the far-side occupant against lateral movement within the vehicle.

According to another aspect, an airbag module is provided for protecting an occupant of a far-side vehicle seat in a near-side impact crash event. The airbag module comprises an inflatable airbag cushion and an inflator for providing inflation gas for the airbag cushion. The airbag module is configured to be mounted to an inboard side of a near-side vehicle seat located adjacent to the far-side vehicle seat containing the occupant. In a near-side impact crash event the airbag cushion is configured to inflate into a position inboard of the near-side and far-side vehicle seats with a deployment angle of the entire airbag cushion obliquely oriented to direct the airbag cushion toward the far-side vehicle seat to thereby provide restraint of the far-side occupant against lateral movement within the vehicle. At least one external tether is arranged and configured to attach the airbag cushion to the near-side vehicle seat to restrain the airbag cushion from moving away from the far-side occupant by a far-side occupant load applied to the airbag cushion in a near-side impact crash event.

According to another aspect, a vehicle assembly comprises a driver seat and a passenger seat spaced from the driver seat in a vehicle width direction. An airbag module is mounted to one of the driver seat and passenger seat. The airbag module includes an inflatable airbag cushion and an inflator for providing inflation gas for the airbag cushion. In a side impact crash event the airbag cushion is adapted to deploy upwards in a vehicle height direction and forward in a vehicle longitudinal direction inboard of the driver seat and passenger seat with a deployment angle of the entire airbag cushion obliquely oriented to direct the airbag cushion toward the other of the driver seat and passenger seat to thereby provide restraint of an occupant sitting in the other of the driver seat and passenger seat against lateral movement within the vehicle. The airbag cushion includes a forward extension portion and a rear lobe portion. The rear lobe portion is arranged and configured to contact a seat back of the other of the driver seat and passenger seat to restrain movement of the airbag cushion back toward the one of the one of the driver seat and passenger seat by an occupant load applied to the airbag cushion.

BRIEF DESCRIPTION OF THE DRAWINGS

FIGS. 6-9 further schematically depict that in a near-side impact crash event the exemplary airbag cushion being configured to at least partially overlap the far-side vehicle seat in each of the positions.

DETAILED DESCRIPTION

It should, of course, be understood that the description and drawings herein are merely illustrative and that various modifications and changes can be made in the structures disclosed without departing from the present disclosure. As used herein, lateral directions are transverse across the vehicle, i.e., left and right, width directions. Likewise, longitudinal directions refer to forward and rearward directions of vehicle travel, and the vertical directions relate to elevation, i.e., upward and downward, height directions.

Figure 1:
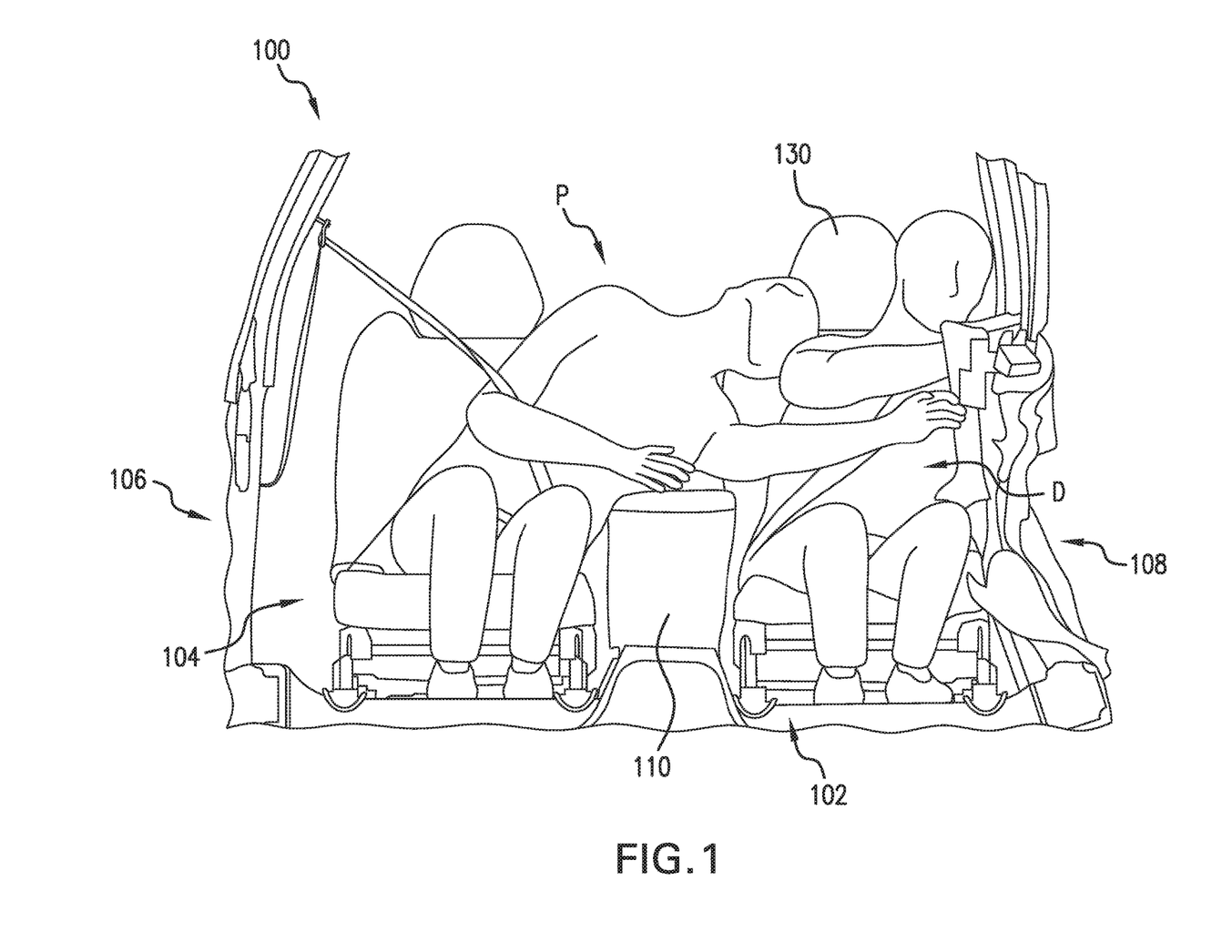
FIG. 1 is a schematic illustration of a vehicle during a side impact crash event without a side impact occupant restraint airbag module according to the present disclosure.

Referring now to the drawings, wherein like numerals refer to like parts throughout the several views, FIG. 1 schematically illustrates a vehicle 100 in a side impact crash event. The vehicle 100 includes a driver seat 102 and a passenger seat 104 spaced from the driver seat in a vehicle width direction. In a side impact crash event, an occupant sitting on the non-struck side 106 of the vehicle (the passenger P in FIG. 1) is directed towards the struck side 108 of the vehicle. This can result in undesired interactions with the occupant sitting on the struck side (the driver D in FIG. 1) and/or interior objects of the vehicle (e.g., a center console 110 positioned laterally between the driver and passenger seats). Hereinafter, for convenience of explanation of the driver side impact crash event of FIG. 1, the driver seat 102 is referred to the "near-side vehicle seat 102", the driver D is referred to as the "near-side occupant", the passenger seat 104 is referred to the "far-side vehicle seat 104", and the passenger P is referred to as the "far-side occupant". It should be appreciated that like designations are application for a passenger side impact crash event.

Figure 2:
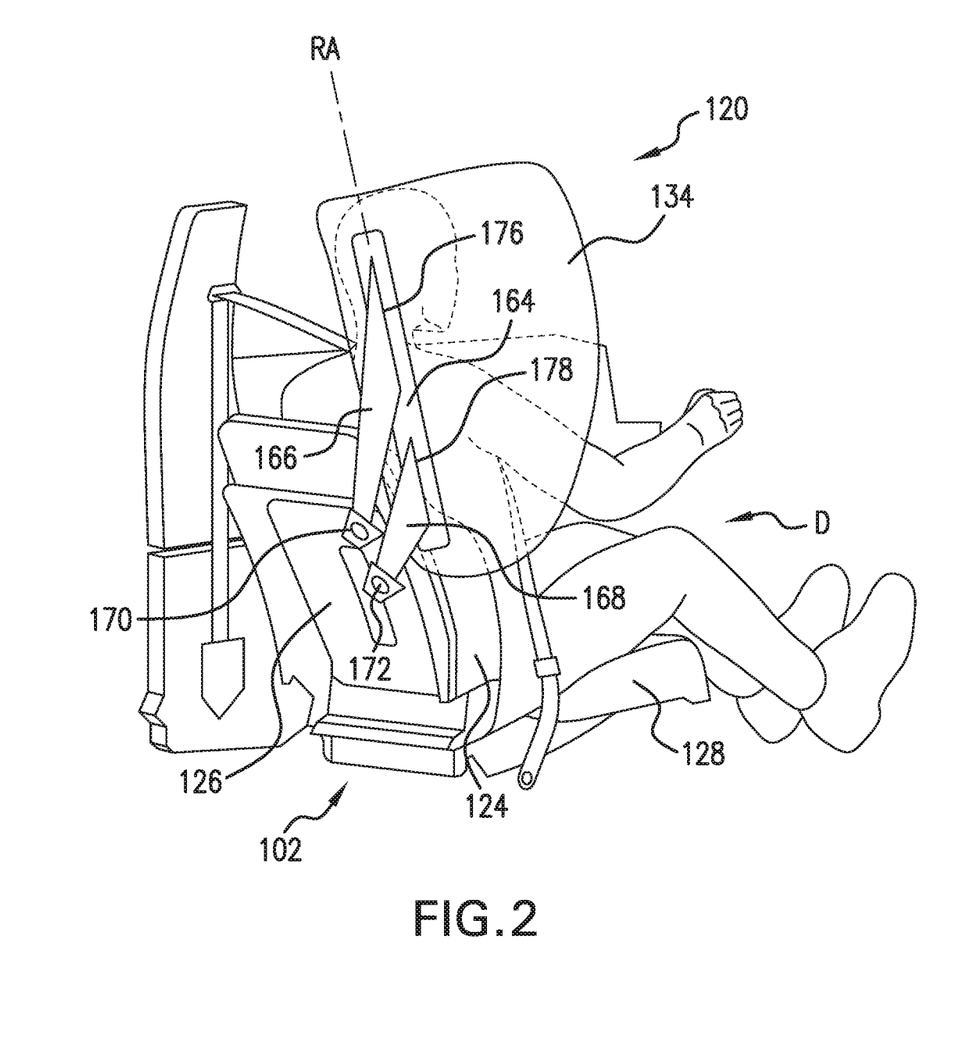
FIGS. 2-5 schematically depict the exemplary side impact occupant restraint airbag module mounted on a near-side vehicle seat, the airbag module including an inflator and an airbag cushion, the airbag cushion depicted in its deployed state for protecting a far-side occupant seated in a far-side vehicle seat.
Figure 3:
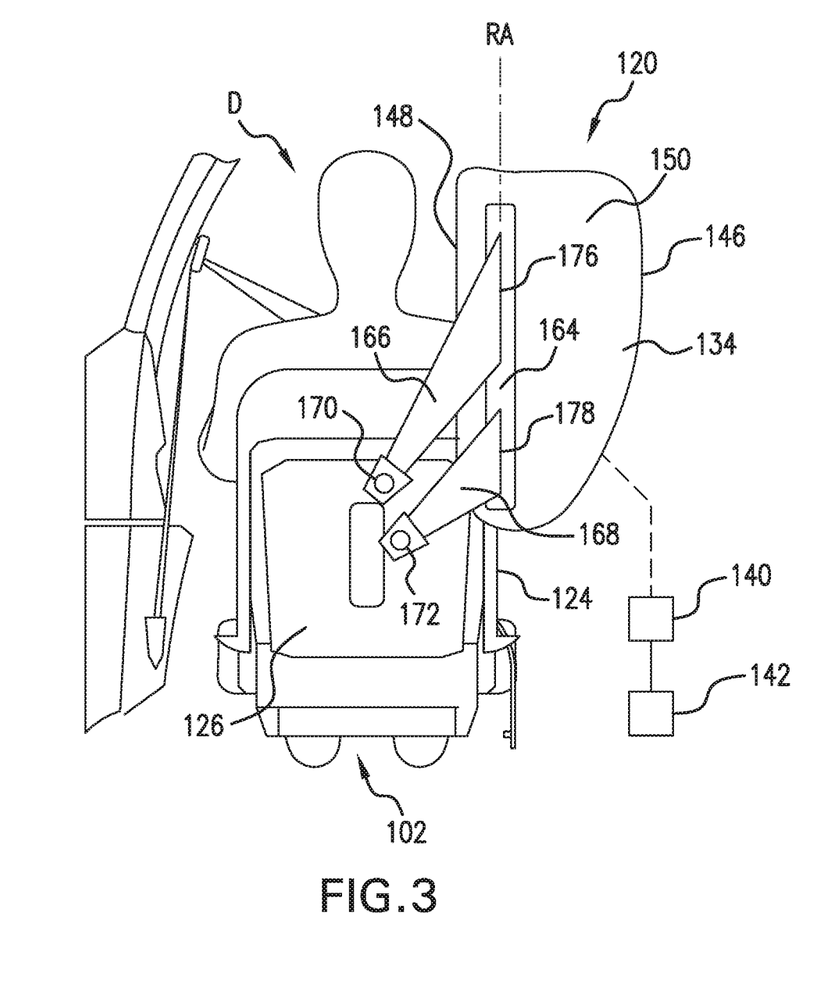
Figure 4:
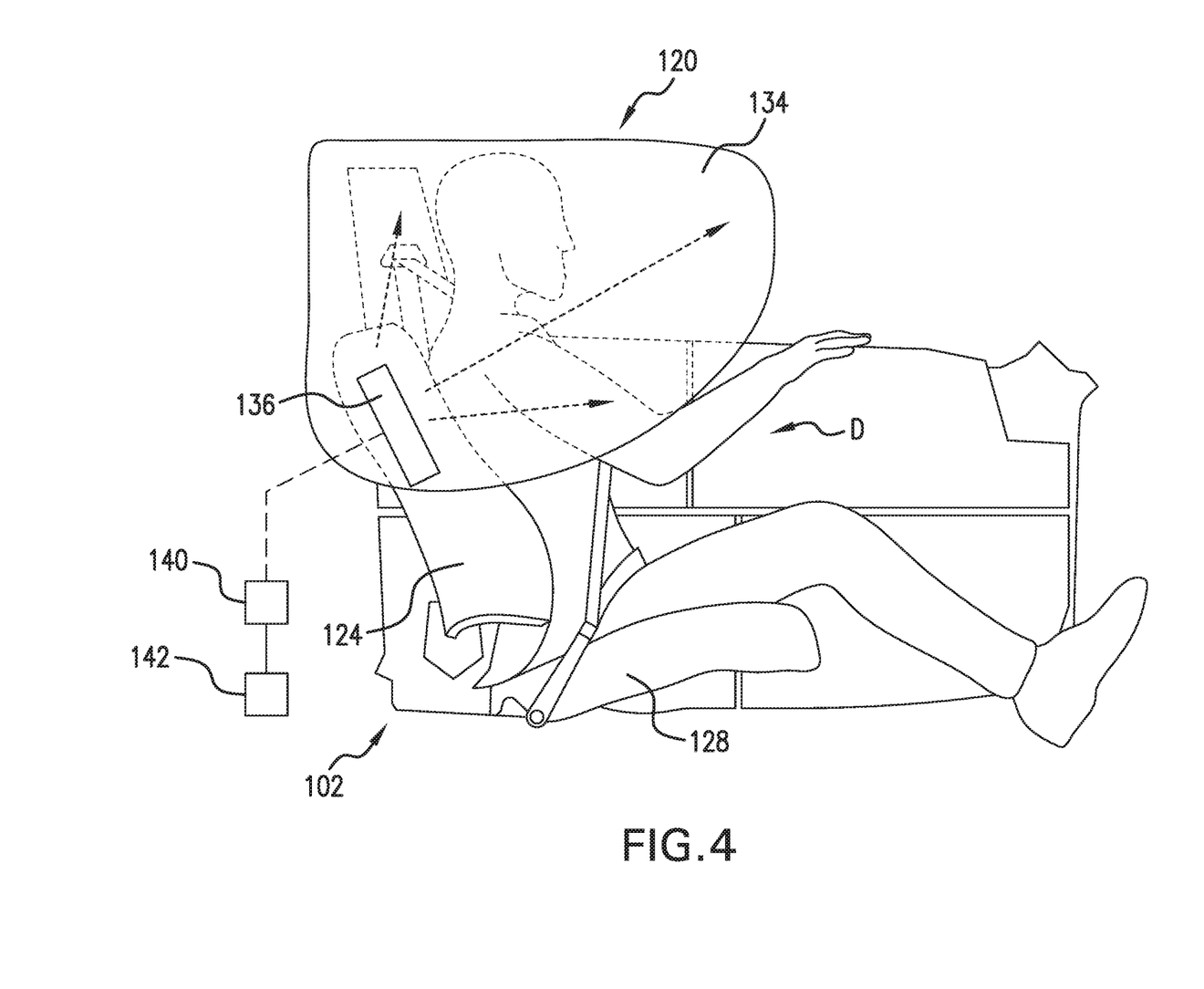

According to the present disclosure, and with reference to FIGS. 2-4, an airbag module 120 is mounted to the near-side vehicle seat 102 to restrain the far-side occupant which in turn reduces the likelihood of contact between the occupants and/or the vehicle interior objects. The exemplary airbag module 120 is mounted to an inboard side 124 (a side located inward in the vehicle width direction) of a seat back 126 of the near-side vehicle seat 102. The seat back 126 can be reclinably connected to a rear end of a seat cushion 128, and a headrest 130 (FIG. 1) is connected to an upper end of the seat back 126. The airbag module 120 includes an inflatable airbag cushion 134 and an inflator 136 (gas generator) as main components. The inflator 136 may be of conventional configuration and may be configured to be housed in the seat back 126 and to provide inflation gas into the airbag cushion 134 during airbag deployment. The airbag cushion 134 may be made of one or more than one panel coupled by stitching to expand when inflated during airbag deployment to provide protection to the far-side occupant. It should be appreciated that a side impact ECU 140 can be mounted in the vehicle and can be electrically connected to the inflator 136. A side impact sensor 142 adapted to predict and/or detect a side impact crash event can be electrically connected to the side impact ECU 140. The side impact ECU 140 is configured to actuate the inflator 136 based on a signal from the side impact sensor 142. The gas injected from the inflator 136 is then supplied into the airbag cushion 134 so as to bring the airbag cushion to inflate and deploy.

Figure 5:
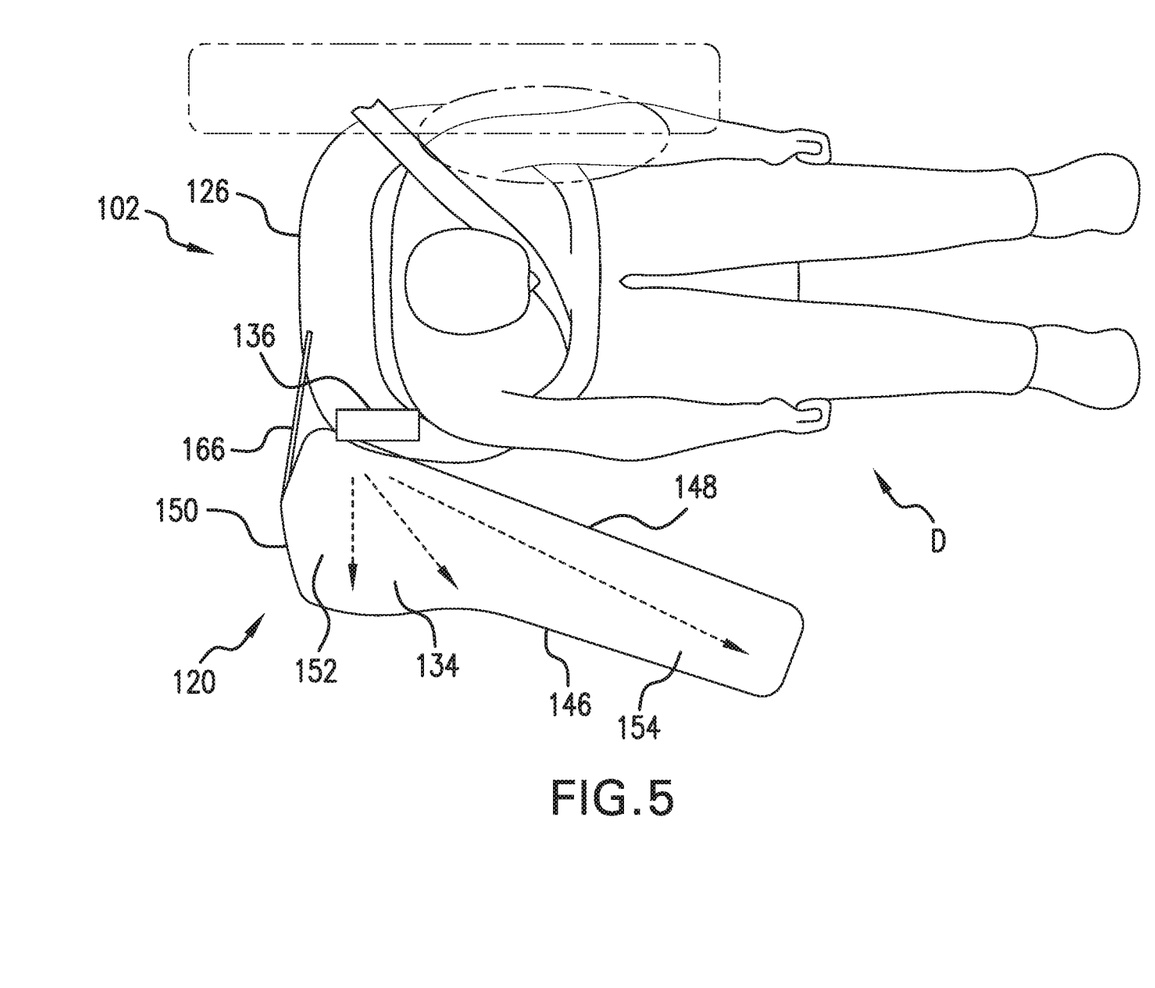
Figure 6:
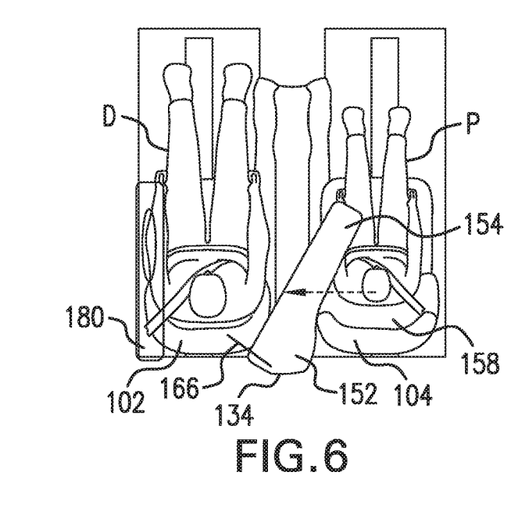
FIGS. 6-9 schematically depict the near-side vehicle seat and the far-side vehicle seat having an aligned position, a forwardmost offset position, and a rearwardmost offset position.
Figure 7:
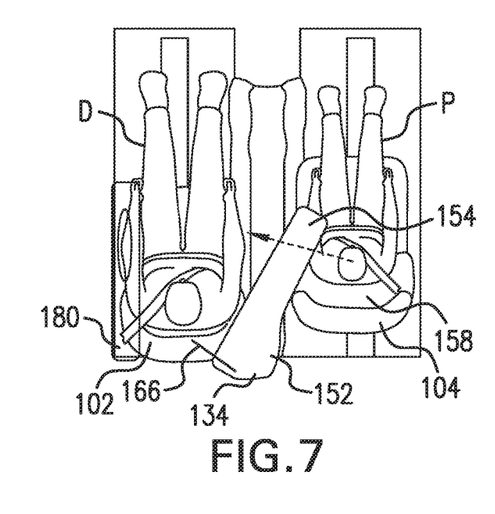
Figure 8:
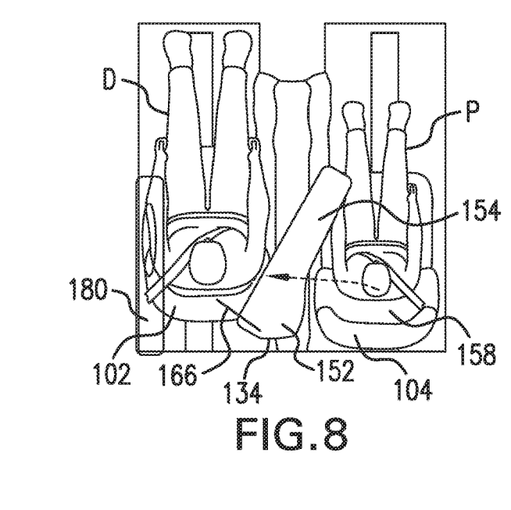
Figure 9:
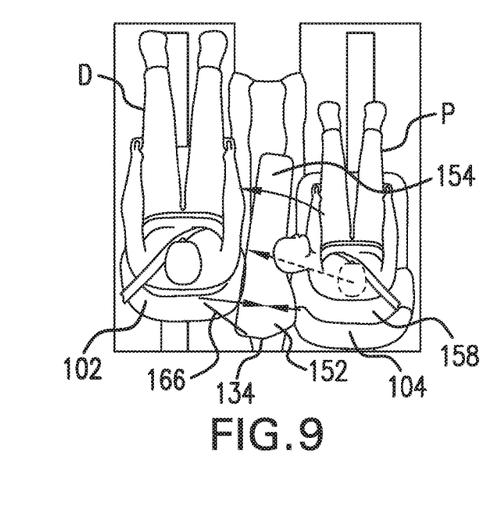

In the depicted embodiment, the airbag cushion 134 includes a far-side occupant facing surface 146, a near-side surface 148 opposite the far-side occupant facing surface 146, and a mounting surface 150 provided laterally in the vehicle width direction between the far-side occupant facing surface 146 and the near-side surface 148. The mounting surface 150 is secured to the seat back 126 of the near-side vehicle seat 102. Further, the respective surfaces 146, 148, 150 of the airbag cushion 134 in a deployed state define a rear lobe inflatable chamber or portion 152 and an extension inflatable chamber or portion 154 (FIG. 5). The rear lobe portion 152 is adapted and designed to bulge laterally toward and engage the far-side vehicle seat 104, specifically a seat back 158 of far-side vehicle seat 104 (FIGS. 6 and 9). The extension portion 154 is adapted and designed to have a reduced width compared to the rear lobe portion 152 and projects forward of the rear lobe portion 152 in a longitudinal direction of the vehicle. According to the present disclosure, in a near-side impact crash event (FIG. 1) the airbag cushion 134 deploys or unfolds from inflation gas in both a vehicle height direction and the vehicle longitudinal direction and expands in thickness in the lateral direction. As depicted, the airbag cushion 134 deploys forward with a deployment angle (i.e., deployment trajectory) of the entire airbag cushion 134 relative to the vehicle longitudinal direction obliquely oriented to direct the airbag cushion 134 away from the near-side vehicle seat 102 and toward the far-side vehicle seat 104. With the deployment angle of the airbag cushion 134 towards the far-side occupant, the airbag cushion is configured to avoid the near-side occupant while unfolding. The airbag cushion 134 is configured to actively engage the far-side occupant and gradually absorb a far-side occupant load applied to the airbag cushion. This, in turn, provides restraint of the far-side occupant against lateral movement within the vehicle 100.

As indicated previously, the airbag cushion 134 in the deployed state includes the rear lobe portion 152 and the extension portion 154. The rear lobe portion 152 is designed to engage the seat back 158 of the far-side vehicle seat 104 thereby being pinched or wedged between the near-side vehicle seat 102 and the far-side vehicle seat 104 (FIG. 6, for example). This, in turn, can increase internal pressure through reduction in volume of the rear lobe portion 152, therefore increasing the rigidity of the airbag cushion 134 (particularly the extension portion 154) and improving restraint of the far-side occupant. Further, this engagement of the seat back 158 can restrain movement of the airbag cushion 134 back toward the near-side vehicle seat 102 by a far-side occupant load applied to the airbag cushion 134. The extension portion 154 is configured to have sufficient strength to resist buckling once engaged with the far-side occupant.

With reference to FIGS. 2 and 3, the exemplary airbag module 120 includes at least one external tether configured to interconnect a reinforcement 164 provided on, for example, the mounting surface 150 of the airbag cushion 134 and the seat back 126 of the near-side vehicle seat 102. The at least one tether is configured to influence the deployment of the airbag cushion 134, so that the airbag cushion 134 is deployed at a location to improve the protection of the far-side occupant. To that end, the connection of the at least one tether to the reinforcement 164 defines a deployment rotational axis RA of the airbag cushion which is oriented in the vehicle height direction allowing for the at least one tether to pull and rotate the deploying airbag cushion 134 toward the far-side occupant. In the deployed state of the airbag cushion the reinforcement 164 is located closer to the near-side surface 148 than the far-side occupant facing surface 146 (thereby offsetting the rotational axis RA closer to the near-side surface 148), and in the vehicle width direction the reinforcement 164 overlaps with the inboard side 124 of the seat back 126 of the near-side vehicle seat 102.

In the depicted aspect, the at least one external tether is an upper tether 166 and a lower tether 168. Each upper and lower tether 166, 168 has a respective first end 170, 172 anchored to the seat back 126 (e.g., by a bolt fastened to a seat back frame) and a respective second end 176, 178 attached to the reinforcement 164 (e.g., by sewing). Further depicted, the upper tether 166 is longer in length than the lower tether 168, which further pulls the deploying airbag cushion 134 toward the far-side vehicle seat 104. In a near-side impact crash event the upper and lower tethers 166, 168 are adapted to rotate the deploying airbag cushion 134 along the deployment rotational axis RA toward the far-side occupant, and the upper and lower tethers 166, 168 are configured to restrain the airbag cushion 134 from moving away from the far-side occupant by a far-side occupant load applied to the airbag cushion. It should be appreciated that each of the upper and lower tethers 166, 168 may be configured substantially as a strap extending between coupling locations and may be made of conventional airbag material, nylon braided strap material, or any useful material that may withstand the tension forces imparted through it and that may allow for coupling to the reinforcement 164.

FIGS. 6-9 show that the near-side vehicle seat 102 and the far-side vehicle seat 104 have an aligned position (FIG. 6), a forwardmost offset position (FIG. 7), and a rearwardmost offset position (FIG. 8), and in a near-side impact crash event at least the extension portion 154 of the airbag cushion 134 is configured to at least partially overlap the far-side vehicle seat 104 in each of the positions. The airbag cushion 134 is configured to receive impact from the head and/or upper torso of the far-side occupant and is configured to provide cushioning for the far-side occupant against undesired interactions with the near-side occupant and/or vehicle interior components (e.g., the center console 110). As shown, in a near-side impact crash event, the head and/or upper torso of the far-side occupant will travel towards the near-side occupant (see the dashed lines in FIGS. 6-9). The airbag cushion 134 mounted to the near-side vehicle seat 102 will deploy in position between the near-side and far-side occupants. The rear lobe portion 152 of the airbag cushion 134 extends for interaction with the seat back 158 of the far-side vehicle seat 104, and the extension portion 154 extends for interaction with the far-side occupant. As depicted, as the far-side occupant begins to engage the airbag cushion 134, the far-side occupant may tilt due to, for example, a seatbelt pretensioner and the head and/or upper torso of the far-side occupant will be cushioned by at least the extension portion 154 thereby protecting the far-side occupant. The near-side occupant will be protected from the incoming far-side occupant in between a roof rail (e.g., a side curtain) airbag 180 and the airbag cushion 134.

FIG. 9 depicts the airbag cushion 134 with a far-side occupant load applied thereto. The rear lobe portion 152 reacts against the seat back 158 of the far-side vehicle seat 104 providing increased restraint for the far-side occupant and helping to prevent the far-side occupant from interacting with the near-side occupant and/or vehicle interior components. The head and/or upper torso of the far-side occupant load the airbag cushion 134 causing it to rotate towards the impact direction. However, as indicated previously, the upper and lower tethers 166, 168 are configured to restrain the airbag cushion 134 from moving away from the far-side occupant by a far-side occupant load applied to the airbag cushion 134.

As is evident from the foregoing, the airbag cushion 134 is adapted to control the far-side occupant's upper torso and head motion which limits excursion towards the struck side 108 of the vehicle 100 and the near-side occupant. This in turns minimizes the risk of contact between the near-side and far-side occupants and the far-side occupant and the interior components of the vehicle. The airbag cushion 134 also serves as an energy absorber between the near-side and far-side occupants and between the far-side occupant and the interior components of the vehicle to minimize the severity of any contact that may occur.

Although the exemplary airbag module 120 is shown to be stored in the driver seat 102, those skilled in the art will recognize that the airbag module 120 disclosed herein can be included within any seat assembly (e.g., the passenger seat 104 and a rear seat) and is not limited by the illustrations herein. It should be appreciated that the airbag module 120 can be mounted in both the driver seat 102 and the passenger seat 104. Further, the airbag module 120 may be stored in and deployed from bucket-style seat assemblies, such as that shown in the above described figures, or may be stored in and deployed from any other style seat assembly (e.g., bench seats).

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A side impact occupant restraint airbag module mounted on a near-side vehicle seat for protecting a far-side occupant seated in a far-side vehicle seat, the airbag module comprising:
   an inflatable airbag cushion and an inflator for providing inflation gas for the airbag cushion,
   wherein the airbag cushion includes a far-side occupant facing surface, a near-side surface opposite the far-side occupant facing surface, and a mounting surface provided laterally in a vehicle width direction between the far-side occupant facing surface and the near-side surface, the mounting surface secured to a seat back of the near-side vehicle seat, the airbag cushion in a deployed state having a rear lobe portion bulging laterally toward a seat back of the far-side vehicle seat and an extension portion having a reduced width compared to the rear lobe portion and projecting forward of the rear lobe portion in a vehicle longitudinal direction, where in a near-side impact crash event the airbag cushion is adapted to deploy upwards in a vehicle height direction and forward in the vehicle longitudinal direction with a deployment angle of the entire airbag cushion obliquely oriented to direct the airbag cushion away from the near-side vehicle seat and toward the far-side vehicle seat to thereby provide restraint of the far-side occupant against lateral movement within the vehicle,
   wherein at least one external tether interconnects the airbag cushion and the seat back of the near-side vehicle seat, the at least one tether includes a first end attached to the seat back of the near-side vehicle seat and a second end attached to a reinforcement provided on the mounting surface of the airbag cushion, the connection of the second end of the at least one tether to the reinforcement defines a deployment rotational axis of the airbag cushion.

2. The airbag module of claim 1, wherein the airbag cushion in the deployed state is adapted to engage the far-side vehicle seat.

3. The airbag module of claim 2, where in the deployed state of the airbag cushion the rear lobe portion is adapted to engage the seat back of the far-side vehicle seat to restrain movement of the airbag cushion back toward the near-side vehicle seat by a far-side occupant load applied to the airbag cushion in a near-side impact crash event.

4. The airbag module of claim 1, wherein the airbag module is mounted to an upper portion of an inboard side of the seat back of the near-side vehicle seat.

5. The airbag module of claim 1, wherein the deployment rotational axis of the airbag cushion is oriented in the vehicle height direction.

6. The airbag module of claim 1, wherein the at least one external tether is an upper tether and a lower tether, each upper and lower tether having a first end anchored to the seat back and a second end attached to the reinforcement, wherein the upper tether is longer in length than the lower tether, and in a near-side impact crash event the upper and lower tethers are configured to restrain the airbag cushion from moving away from the far-side occupant by a far-side occupant load applied to the airbag cushion.

7. The airbag module of claim 6, where in the deployed state of the airbag cushion the reinforcement is located closer to the near-side surface than the far-side occupant facing surface.

8. The airbag module of claim 6, where in the deployed state of the airbag cushion the reinforcement overlaps with an inboard side of the seat back of the near-side vehicle seat.

9. The airbag module of claim 6, wherein the upper and lower tethers are adapted to rotate the airbag cushion along the deployment rotational axis toward the far-side occupant as the airbag cushion is being deployed in response to a near-side impact crash event.

10. The airbag module of claim 1, wherein the near-side vehicle seat and the far-side vehicle seat have an aligned position, a forwardmost offset position, and a rearwardmost offset position, and in a near-side impact crash event the extension portion of the airbag cushion is configured to at least partially overlap the far-side seat in each of the positions and is configured to receive impact from the head of the far-side occupant.

11. An airbag module for protecting an occupant of a far-side vehicle seat in a near-side impact crash event, the airbag module comprising:
    an inflatable airbag cushion; and
    an inflator for providing inflation gas for the airbag cushion;
    wherein the airbag module is configured to be mounted to an inboard side of a near-side vehicle seat located adjacent to the far-side vehicle seat containing the occupant, where in a near-side impact crash event the airbag cushion is configured to inflate into a position inboard of the near-side and far-side vehicle seats with a deployment angle of the entire airbag cushion obliquely oriented to direct the airbag cushion toward the far-side vehicle seat to thereby provide restraint of a far-side occupant against lateral movement within the vehicle,
    wherein at least one external tether is arranged and configured to attach the airbag cushion to the near-side vehicle seat to restrain the airbag cushion from moving away from the far-side occupant by a far-side occupant load applied to the airbag cushion in a near-side impact crash event,
    wherein the at least one external tether is an upper tether and a lower tether, each upper and lower tether having a first end anchored to a seat back of the near-side vehicle seat and a second end attached to a reinforcement provided on the airbag cushion, where in a near-side impact crash event the upper and lower tethers are configured to restrain the airbag cushion from moving away from the far-side occupant by a far-side occupant load applied to the airbag cushion.

12. The airbag module of claim 11, wherein the airbag cushion includes a forward extension portion and a rear lobe portion bulging laterally toward the far-side vehicle seat.

13. The airbag module of claim 12, wherein the airbag cushion in a deployed state is adapted to engage the far-side vehicle seat.

14. The airbag module of claim 13, where in the deployed state of the airbag cushion the rear lobe portion is adapted to engage a seat back of the far-side vehicle seat to restrain movement of the airbag cushion back toward the near-side vehicle seat by a far-side occupant load applied to the airbag cushion in a near-side impact crash event.

15. The airbag module of claim 11, wherein the connections of the upper and lower tethers to the reinforcement together define a deployment rotational axis of the airbag cushion which is oriented in a vehicle height direction.

16. The airbag module of claim 11, wherein the airbag module is mounted to an upper portion of an inboard side of a seat back of the near-side vehicle seat, the airbag cushion is adapted to deploy upwards in a vehicle height direction and forward in a vehicle longitudinal direction.

17. A vehicle assembly comprising:
    a driver seat and a passenger seat spaced from the driver seat in a vehicle width direction; and
    an airbag module mounted to one of the driver seat and passenger seat, the airbag module including an inflatable airbag cushion and an inflator for providing inflation gas for the airbag cushion, wherein in a side impact crash event the airbag cushion is adapted to deploy upwards in a vehicle height direction and forward in a vehicle longitudinal direction inboard of the driver seat and passenger seat with a deployment angle of the entire airbag cushion obliquely oriented to direct the airbag cushion toward the other of the driver seat and passenger seat to thereby provide restraint of an occupant sitting in the other of the driver seat and passenger seat against lateral movement within the vehicle, wherein the airbag cushion includes a forward extension portion and a rear lobe portion, the rear lobe portion arranged and configured to deploy laterally toward and contact a seat back of the other of the driver seat and passenger seat to restrain movement of the airbag cushion back toward the one of the one of the driver seat and passenger seat by an occupant load applied to the airbag cushion.

18. The vehicle assembly of claim 17, wherein the airbag module includes at least one external tether attaching the airbag cushion to a seat back of the one of the driver seat and passenger seat to restrain the airbag cushion from moving away from the occupant by the occupant load applied to the airbag cushion in a side impact crash event.

19. The vehicle assembly of claim 17, wherein the driver seat and the passenger seat have an aligned position, a forwardmost offset position, and a rearwardmost offset position, where in a side impact crash event the airbag cushion is configured to at least partially overlap the other of the driver seat and the passenger seat in each of the positions and is configured to receive impact from the head of the occupant.

* * * * *